(12) United States Patent
Nechitailo et al.

(10) Patent No.: US 6,654,525 B2
(45) Date of Patent: Nov. 25, 2003

(54) CENTRAL STRENGTH MEMBER WITH REDUCED RADIAL STIFFNESS

(75) Inventors: Nicholas V. Nechitailo, Conover, NC (US); Dean J. Rattazzi, Hickory, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/141,871

(22) Filed: May 10, 2002

(65) Prior Publication Data

US 2003/0068146 A1 Apr. 10, 2003

Related U.S. Application Data

(63) Continuation-in-part of application No. 09/972,901, filed on Oct. 10, 2001.

(51) Int. Cl.[7] .................................................. G02B 6/44
(52) U.S. Cl. ........................ 385/103; 385/100; 385/109; 385/113
(58) Field of Search ................................. 385/100, 103, 385/105, 109, 110, 113

(56) References Cited

U.S. PATENT DOCUMENTS

| | | | |
|---|---|---|---|
| 4,515,435 A | | 5/1985 | Anderson |
| 4,709,983 A | | 12/1987 | Plessner et al. |
| 5,268,983 A | | 12/1993 | Tatarka et al. |
| 5,389,442 A | | 2/1995 | Arroyo et al. |
| 5,621,841 A | | 4/1997 | Field |
| 5,630,003 A | * | 5/1997 | Arroyo ..................... 385/113 |
| 5,751,879 A | | 5/1998 | Graham et al. |
| 5,982,965 A | * | 11/1999 | Cheron et al. ............. 385/100 |
| 6,035,087 A | | 3/2000 | Bonicel et al. |
| 6,278,833 B1 | * | 8/2001 | Lee .......................... 385/100 |
| 6,377,738 B1 | * | 4/2002 | Anderson et al. ......... 385/113 |

* cited by examiner

*Primary Examiner*—Audrey Chang
*Assistant Examiner*—Denise S. Allen
(74) *Attorney, Agent, or Firm*—Sughrue Mion, PLLC (57) ABSTRACT

An optical fiber cable configuration having a central strength member. The central strength member includes a hollow tube. One or more strength rods are disposed along or within the tube. To avoid water penetration, the tube is filled with a gel or water-absorbing powder, which provides a water barrier.

31 Claims, 8 Drawing Sheets

CENTRAL STRENGTH MEMBER WITH REDUCED RADIAL STIFFNESS

This application is a continuation in part of U.S. Ser. No. 09/972,901 filed on Oct. 10, 2001.

BACKGROUND OF THE INVENTION

1. Field of the Invention

The present invention generally relate to the field of fiber optic cables and, in particular, the present invention is directed to a fiber optic cable configuration having a central strength member with reduced radial stiffness.

2. Discussion of Related Art

Optical fibers are very small diameter glass strands that are capable of transmitting an optical signal over great distances, at high speeds, and with extremely low signal loss as compared to standard wire or cable networks. Optical fiber has found increasingly widespread application and currently constitutes the backbone of the worldwide telecommunication network. Because of this development, there has been a growing need for better quality optical fiber cables with a decrease in production time and costs, while ensuring adequate robustness for continued operation in increasingly harsh conditions. Proper signal transmission requires structurally sound jackets and protective covers to protect the optical fiber from potentially damaging external forces.

In general, optical fibers are manufactured from relatively large diameter glass preforms. Fiber optic preforms are generally made with concentric glass layers. The inner layer, or core, is made of a very high quality, high purity $SiO_2$ glass. This high purity core is the portion of the optical fiber in which the optical data is transmitted. Concentrically positioned around the high purity core is a second layer of glass, or cladding, with a lower index of refraction than the inner core, and generally is less pure. The difference in refraction indices between the core and cladding allows the optical signals in the core to be continuously reflected back into the core as they travel along the fiber. The combination of the core and cladding layers is often referred to as the "primary preform." The optical fiber is formed by heating and softening a portion of the preform, and rapidly drawing the softened portion with specialized equipment. The length of the drawn optical fiber is typically several thousands of times the length of the primary preform. The aggregate of the optical fiber, jackets and additional integrated mechanical supports is typically referred to as an optical fiber cable. An integral part of the optical fiber cable configuration is a central strength member. The central strength member (CSM) is traditionally used to provide protection to the cable against strains arising from material contraction at low temperatures, as well as under cable bending and tension forces, which are often present during cable installation conditions.

Figure 1:
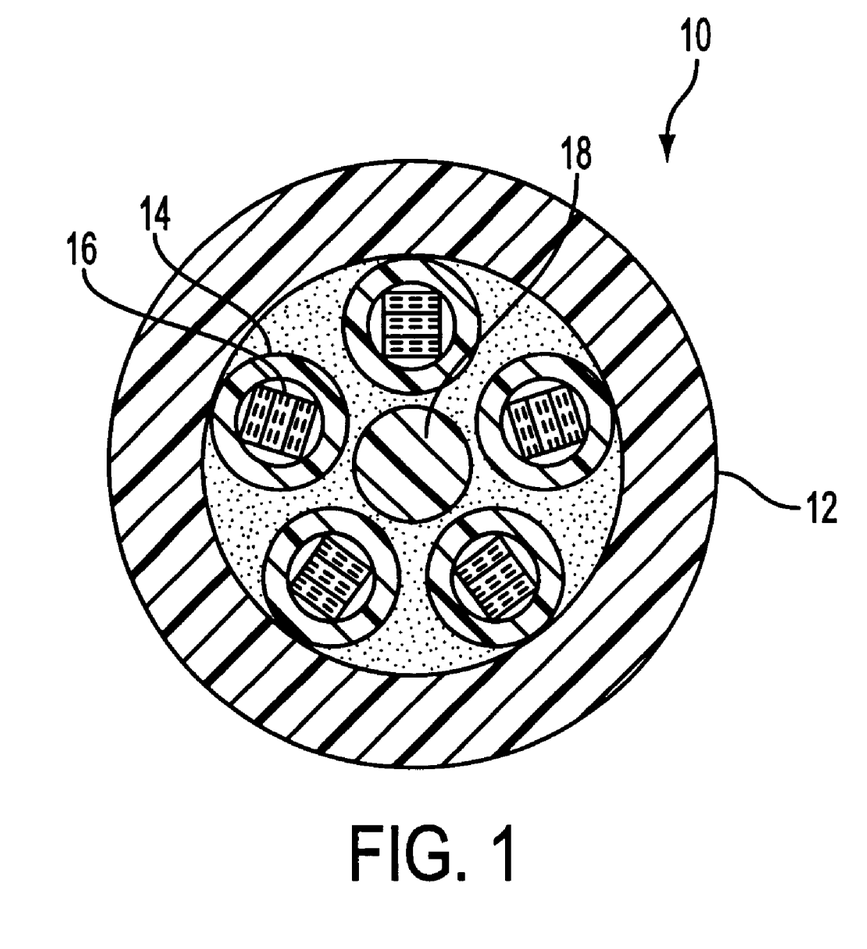
FIG. 1 is a sectional view of a traditional optical fiber cable configuration.

A traditional optical fiber cable configuration 10 is shown in FIG. 1. An outer jacket 12 is provided to enclose and protect a plurality of buffer tubes 14. The buffer tubes may contain loose optical fibers, or optical fiber ribbons 16. The buffer tubes 14 are radially disposed around a central strength member (CSM) 18. The CSM is commonly made of glass reinforced plastic (GRP) and is used to provide strength and support to the cable configuration 10. Each of the buffer tubes 14 may contain loose fibers 16 or fiber ribbons. U.S. Pat. No. 5,621,841 discloses an optical fiber configuration having a CSM. The buffer tubes are stranded or wrapped around the CSM. The buffer tubes are enclosed by an armor layer and an outer sheath.

Recently, cable manufacturers have been attempting to increase the number of fibers per cable, in addition to reducing the amount of materials used, so as to limit the size of the cables. As a result, buffer tubes have been made to have thinner protective walls, which are commonly made of polypropylene and polybutylene terephthalate (PBT). It has recently been observed that cable configurations designed according to traditional standards are prone to suffer severe damage during installation and sheave testing. Specifically, it has been found that when the cable configuration is compressed in transverse or radial directions, for example, when bent around a sheave or subjected to an external crushing force, the buffer tubes become permanently flattened or indented. In many cases, the buffer tubes tear open, which allows for fiber bundles to protrude out from the buffer tubes, resulting in significant attenuation problems.

Figure 2:
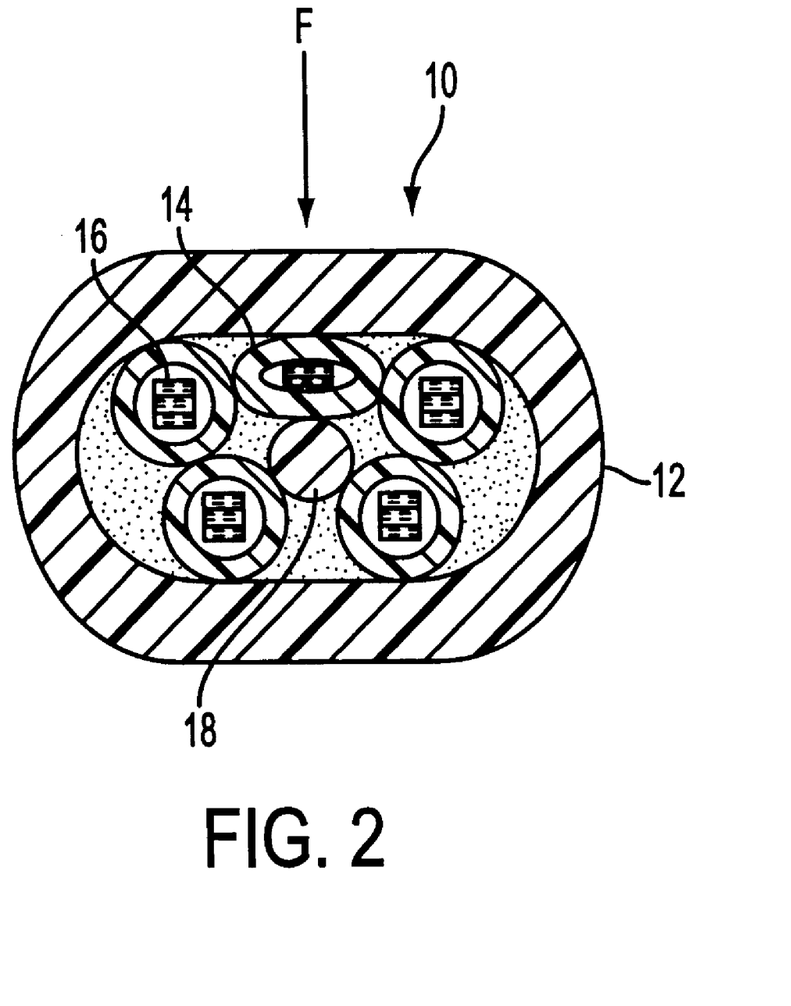
FIG. 2 is a sectional view of the traditional optical fiber cable configuration of FIG. 1 when subjected to a transverse compression force.

A main cause of the damage to the buffer tubes is due to a force exerted onto the buffer tubes by the CSM. As disclosed in U.S. Pat. No. 5,621,841, the CSM is often made to be incompressible in compression with other elements of the cable. In other words, the radial stiffness of the CSM is much higher than that of the buffer tube. As a result of the CSM being incompressible in comparison with other elements such as the buffer tubes, external compression forces are not absorbed by the CSM, but instead are transmitted from the CSM to the buffer tubes and absorbed by the buffer tubes. As can be seen with reference to FIG. 2, when a compression force F is applied to the cable configuration 10, certain buffer tubes 14 are crushed because the rigid CSM 18 transfers a compression force to the buffer tubes 14, which means that the buffer tubes 14 must absorb the force. Accordingly, the buffer tubes 14 often collapse and recess inwardly causing the optical fibers 16 to exert forces upon the inside of the buffer tubes 14. When either the force of the CSM upon the buffer tubes 14 or the internal force exerted by the optical fibers 16, is large enough, the buffer tubes 14 split open.

Thus, what is needed is a CSM that does not subject the buffer tubes to unacceptable radial forces, when the cable is bent or crushed.

SUMMARY OF THE INVENTION

The present invention is directed to eliminating the above problems associated with the high fiber count optical cables. Thus, the invention improves the quality of the optical fiber cable and provides for a cable configuration that can withstand forces, such as those induced by installation and sheave loads.

The present invention addresses the above problems by providing a modified strength member for an optical fiber cable. The modification is based on the substitution of the conventional solid rod configuration CSM with a hollow tube configuration CSM. The tube contains one or more GRP or other strength rods, positioned loosely in the tube. To avoid water penetration or a "water hose" effect, the tube is filled with a gel or water-absorbing powder or any other water barrier material known in the art.

The present invention further provides for an optical fiber cable configuration having an outer jacket with at least one buffer tube disposed within the outer jacket. One or more optical fibers are positioned in the buffer tube. The buffer tube is stranded around a central strength member, which is disposed longitudinally along the axis of the outer jacket. The CSM has a hollow portion with at least one strength rod loosely positioned within the hollow portion. A gel or water-absorbing powder may be used as a water barrier in the CSM.

The present invention still further provides for an apparatus for an optical fiber configuration including an outer jacket, at least one buffer tube disposed inside of the outer jacket, at least one optical fiber positioned along the buffer tube, and means for strengthening. The means for strengthening is disposed longitudinally along the cable axis, and is operative to have a degree of deformation when a load is applied to the optical fiber configuration. The buffer tube is also operative to have a degree of deformation when the load is applied to the optical fiber cable. According to the present invention, the means for strengthening has a higher degree or the same degree of deformation as the buffer tube when the optical fiber cable is subjected to radial and transverse loads.

The present invention even further provides for a strength member for an optical fiber cable having a tube with a hollow portion and a wall portion, wherein a strength rod is positioned within the wall portion. Alternatively, the invention provides for a strength member for an optical fiber cable having a tube with a hollow portion and a wall, wherein a strength rod is embedded into an inner circumferential area of the wall so as to partially extend into the hollow portion.

These and other objects and advantages of the present invention will become apparent in the course of the following description.

BRIEF DESCRIPTION OF THE DRAWINGS

The advantages, nature and various additional features of the invention will appear more fully upon consideration of illustrative embodiments of the invention which are schematically set forth in the drawings, in which.

DETAILED DESCRIPTION OF ILLUSTRATIVE NON-LIMITING EMBODIMENTS

The present invention will be explained in further detail by making reference to the accompanying drawings, which do not limit the scope of the invention in any way.

Figure 3:
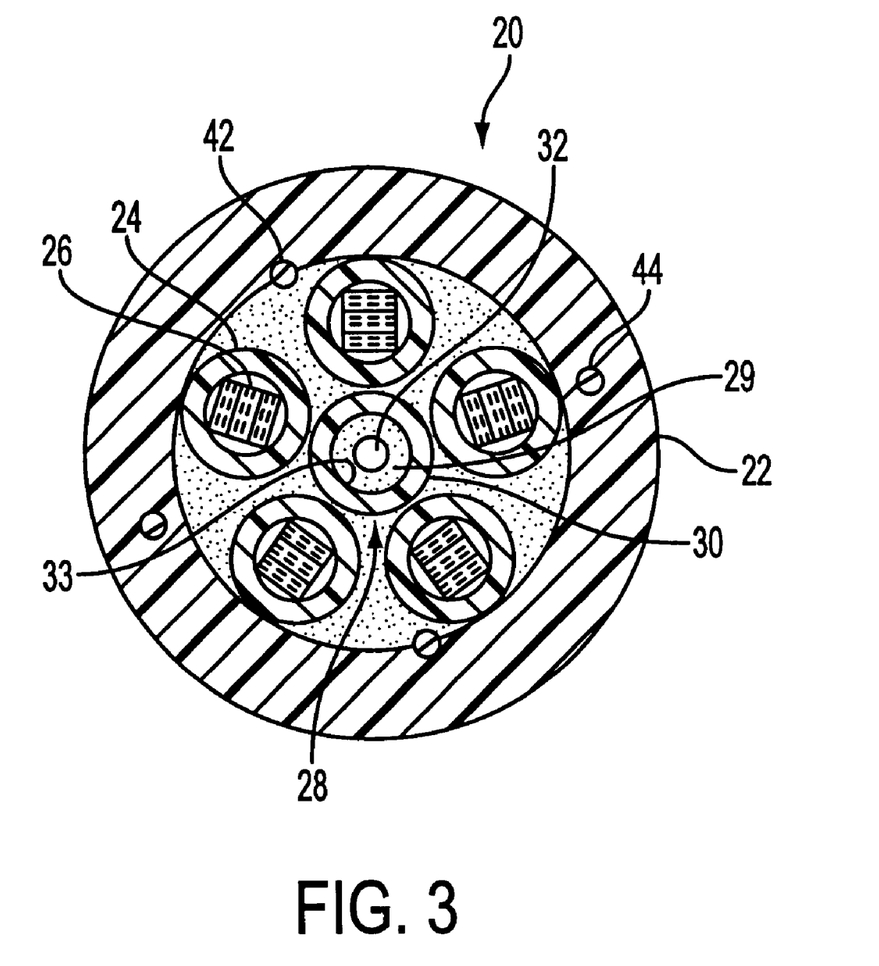
FIG. 3 is sectional view of an optical fiber cable configuration according to the present invention.

With reference to FIG. 3, an optical fiber cable configuration 20 is shown having a tubular outer jacket 22. The outer jacket 22 is used to house a plurality of buffer tubes 24. The buffer tubes 24 contain optical fiber ribbons 26. As one skilled in the art will appreciate, the buffer tubes 24 may also contain other formations of optical fibers. In this embodiment, five buffer tubes are shown; however, the number of buffer tubes 24 may be increased or decreased depending on the application.

According to the present invention, a CSM 28 is positioned concentrically with respect to the outer jacket 22. The CSM 28 includes a tube or strength tube 30, which has a hollowed-out center portion. The tube 30 may be made from a plastic, for example, polyethylene, polypropylene, PBT, PVC and plastic-based composite materials. A large variety of materials including metal, non-metal and composite materials may be used; however, tubes made of a material having a high-Young's modulus should have thinner walls as compared to those made of a softer material, in order to provide for a radial or bending stiffness and flexibility close to that of surrounding buffer tubes. According to the invention, it is desired to have a tube 30 with a bending stiffness close to that of the buffer tubes 24. The bending stiffness of a traditional CSM is typically much greater than the bending stiffness of surrounding buffer tubes. The equation for the bending stiffness is:

$$D = \frac{Eh^3}{12(1-v^2)},$$

where E is the Young's modulus, v is the Poisson's ratio and h is the wall thickness.

As can be seen from the equation, a small increase in the wall thickness (h) results in a significant increase in the stiffness of the tube.

An inner strength member or strength rod 32 is disposed longitudinally within the hollow portion of the tube 30, and may comprise a high-strength, high-Young's modulus material such as a glass-reinforced plastic. Also, a varying number of strength rods 32 may be used in the tube 30 depending on the application. To avoid water penetration or a "water hose" effect, the tube is filled with a gel or water-absorbing powder 29 or any other water barrier material known in the art.

An inner diameter of the hollow tube 30 is dimensioned to be larger that an outside diameter of the strength rod 32, such that an open space exists between at least a portion of the strength rod 32 and an inner wall 33 of the tube 30. Because of the space between the strength rod 32 and the tube 30, the strength rod 32 is permitted to move around in the hollow portion of the tube 30. Other high-strength, high-Young's modulus materials, such as steel wire and other metal alloys, and metal and non-metal composites with a low coefficient of thermal expansion, can be used as the strength rod 32. The use of a material having a low coefficient of thermal expansion is preferred due to its resistance to thermal contraction at low temperatures.

Figure 4:
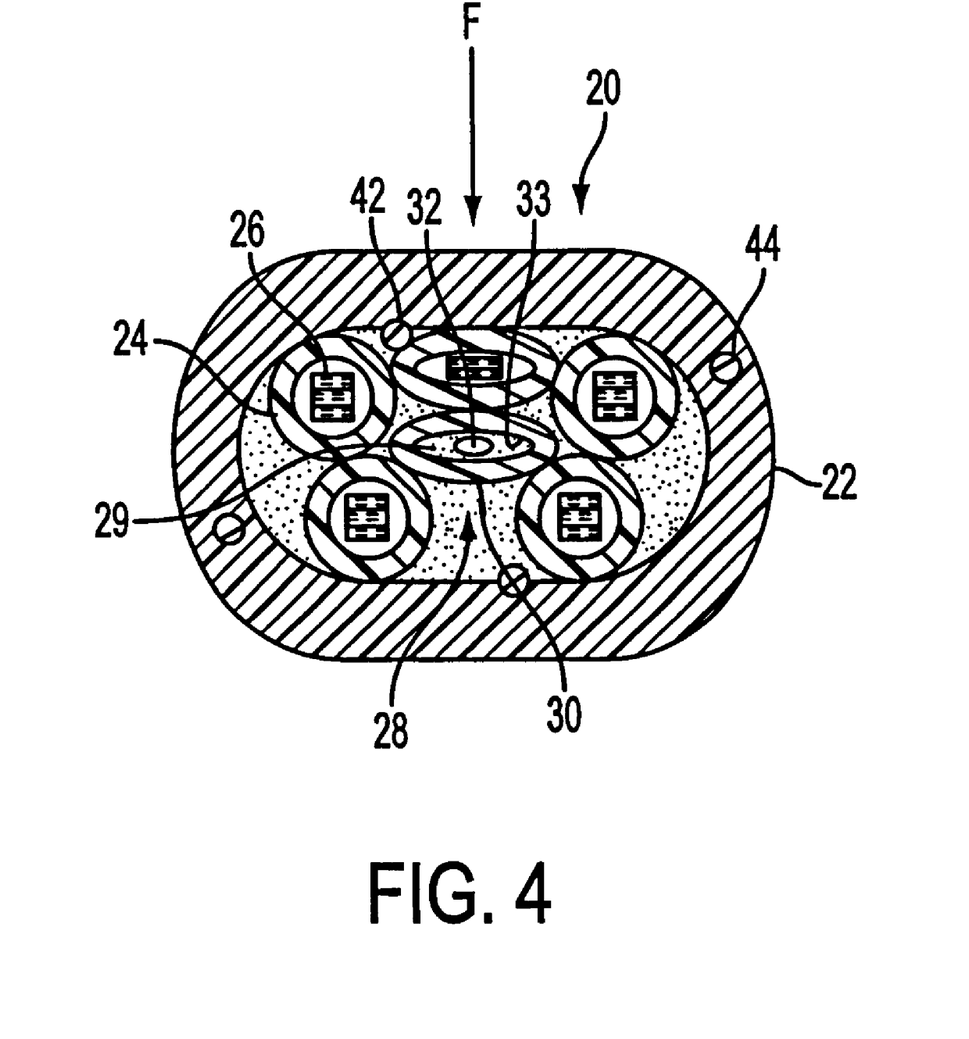
FIG. 4 is sectional view of the optical fiber configuration of FIG. 3 according to the present invention when subjected to a compression force.

FIG. 4 shows the optical fiber configuration 20 being acted on by an external compression force, such as that caused by sheave loading. The force F compacts the buffer tubes 24 against one another and against the CSM 28. However, according to the present invention, the tube 30 of the CSM 28, in addition to the buffer tubes 24, are operative to be deformed. As a result, the tube 30 absorbs a portion of the force F as opposed to transferring substantially all of the force back upon the buffer tubes 24. The tube 30 is capable of absorbing a portion of the force F because it is designed to have a stiffness in the radial direction that is below or close to that of the buffer tube 24. Because the strength rod 32 is movably positioned within the tube 30, it is able to change its position in accordance with the changing shape of the tube 30.

Figure 5:
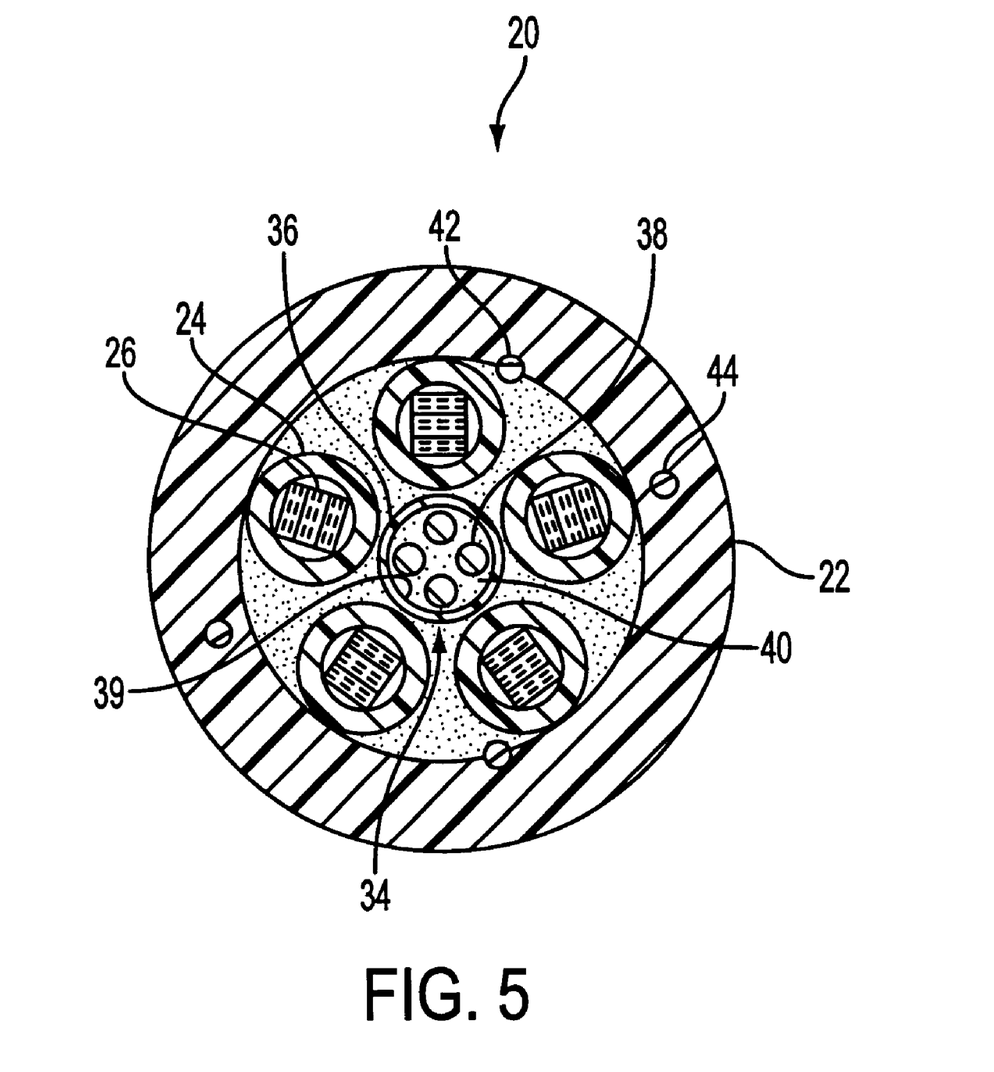
FIG. 5 is sectional view of another optical fiber configuration according to the present invention.

With reference to FIG. 5, another exemplary embodiment of an optical fiber cable configuration 20 according to the present invention is illustrated. Similar to the embodiment of FIG. 3, a tubular outer jacket 22 is used to house a plurality of buffer tubes 24, which are preferably disposed in a radial arrangement, and contain an arrangement of optical fibers, such as in the form of ribbons 26.

In further accordance with the embodiment shown in FIG. 5, a CSM 34 is positioned centrally with respect to the outer jacket 22. The CSM 34 includes a tube or strength tube 36 that has a hollowed-out center portion. The tube 36 may be made of a plastic, such as that described above in reference to the embodiment of FIG. 3, and may have similar material properties. A plurality of inner strength members or strength rods 38 are disposed within the hollow portion of the tube 36, and may be loosely positioned along an inner wall 39 of the tube 36. The strength rods 38 may respectively be made of a material, such as a glass reinforced plastic, as described above in reference to the embodiment of FIG. 3.

A diameter of the hollow center of the tube 36 is dimensioned to allow for the strength rods 38 to be movable within the hollow portion of the tube 36. Thus, the strength rods 38 are permitted to change their location within the tube 36. This aspect allows for the strength rods 38 to conform to a change in shape by the tube 36, while still providing rigidity and support for the overall cable configuration 20. To avoid water penetration or a "water hose" effect, the tube is filled with a gel or water-absorbing powder 40 or any other water barrier material known in the art.

Figure 6:
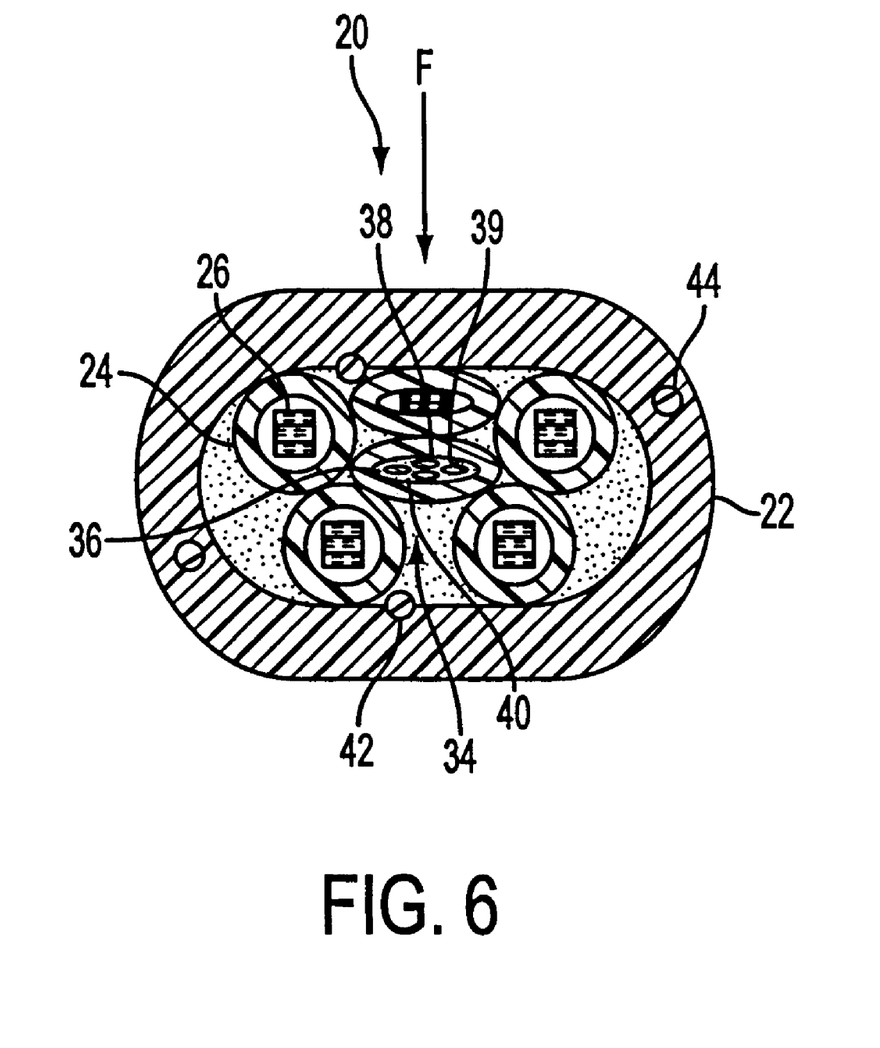
FIG. 6 is sectional view of the optical fiber configuration of FIG. 5 when subjected to a compression force.

FIG. 6 shows the optical fiber configuration 20 of FIG. 5 being acted on by an external compression force F, such as that caused by a sheave load. A sheave load is caused by the cable 20 being dragged over a sheave. Depending on the number of movable strength rods 38 and their deformation mode, the strength rods 38 will provide support for the CSM 34 during deflection caused by the load. For example, three parallel rods positioned approximately 120° with respect to each other will not engage with each other, thus allowing for a larger deformation of the tube 36 without increased resistance. The load between the sheave and strength rods 38 is a function of speed, wherein the movability of the strength rods 38 allows for the load to be distributed in accordance with the load. After the load is removed, the strength rods 38 are operable to return back to their initial position.

As in the embodiment of FIGS. 3 and 4, the force F compacts the buffer tubes 24 against one another and against the CSM 34. According to this embodiment, the tube 36 of the CSM 34 is operative to be deformed by the forces that are transferred from the buffer tubes 24. As a result, the tube 36 absorbs a portion of the force as opposed to transferring it all back upon the buffer tubes 24. The tube 36 is capable of absorbing a portion of the force F because it is designed to have a stiffness in the radial direction, which is close to or smaller than that of the buffer tubes 24.

When comparing the multiple strength rod configurations of FIGS. 5 and 6 and the single strength rod configurations of FIGS. 3 and 4, it is preferable that the cross-sectional area of the single strength rod 32 of FIGS. 3 and 4 be equal to the sum of the cross-sectional areas of the plurality of strength rods 38 of FIGS. 5 and 6, if they are made of the same material. Of course other relative dimensions are considered to be within the scope of the invention.

Figure 7:
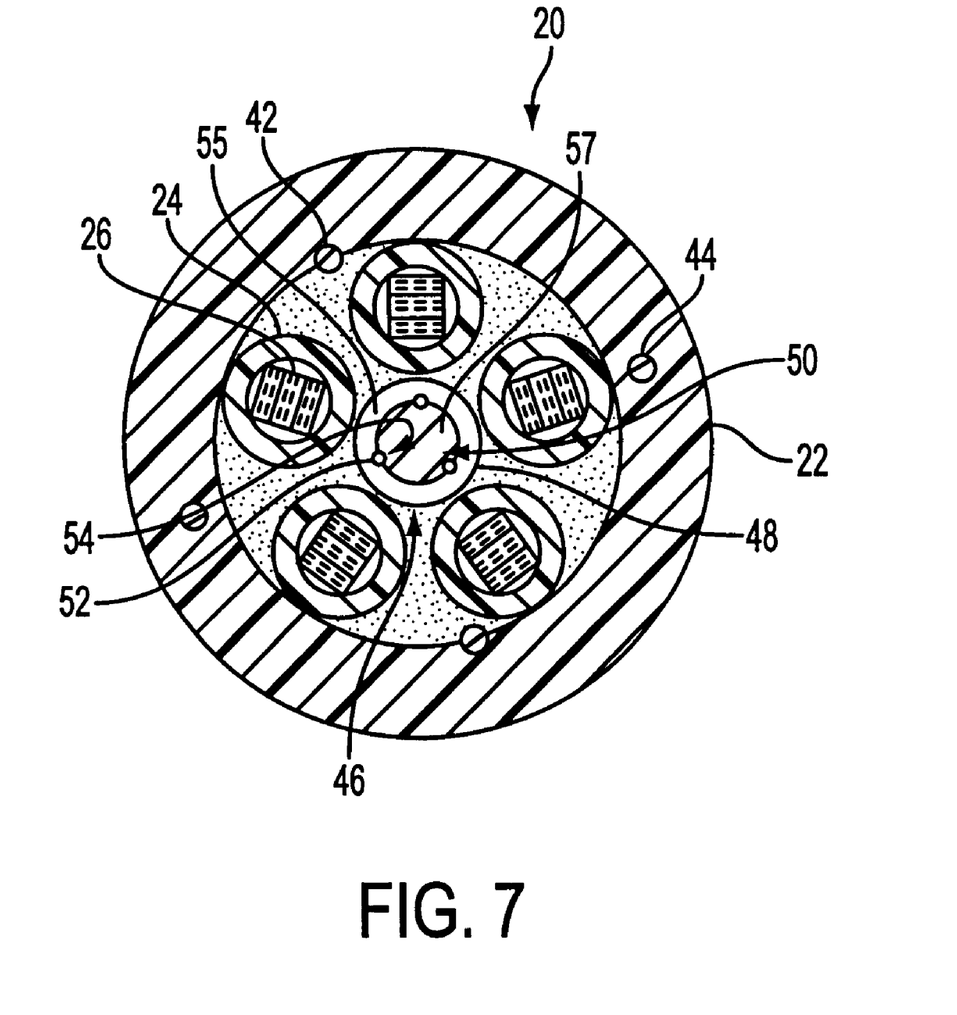
FIG. 7 is sectional view of a further optical fiber configuration according to the present invention.

FIG. 7 illustrates an even further embodiment of an optical fiber cable configuration 20 according to the present invention. Similar to the previous embodiments, a tubular outer jacket 22 is used to house a plurality of buffer tubes 24, which are preferably disposed in a radial arrangement, and contain an arrangement of optical fibers, such as in the form of ribbons 26.

In further accordance with the embodiment shown in FIG. 7, a CSM 46 is positioned centrally with respect to the outer jacket 22. The CSM 46 includes a strength tube 48 that has a center or hollow portion 50, which may be filled with a material, as described further below. The strength tube 48 may be made of a plastic, such as described above in reference to the embodiment of FIG. 3, and may have similar material properties. A single or plurality of inner strength members or strength rods 52 are disposed longitudinally so as to be partially embedded in an inner circumferential wall portion 54 of a wall 55 of the strength tube 48. It is also contemplated that the strengths rods 52 may be positioned on an outer circumferential wall portion of the strength tube 48, in a partially embedded state, or a non-embedded state. The strength rods 52 may respectively be made of a material such as a glass reinforced plastic, as is also described above in reference to the embodiment of FIG. 3. To avoid migration down the length of the cable, the strength tube 48 may be filled with a gel or water-absorbing powder 57 or any other water barrier material known in the art.

In this embodiment, the strength rods 52 are coupled with the strength tube 48 so as to partially extend into the center portion 50 of the strength tube 48. As shown in FIG. 7, three strength rods 52 are added to the strength tube 48 to provide sufficient strength and resistance to thermal contraction. However, as one skilled in the art will appreciate, more or less strength rods 52 may be used depending on the particular application. The coupling of the strength rods 52 with the tube 48 of the central strength member 46, such that a portion of the strength rods 52 extend into the center portion 50, aids in expanding the range of thermo-mechanical loads, that the optical fiber cable may withstand.

Figure 8:
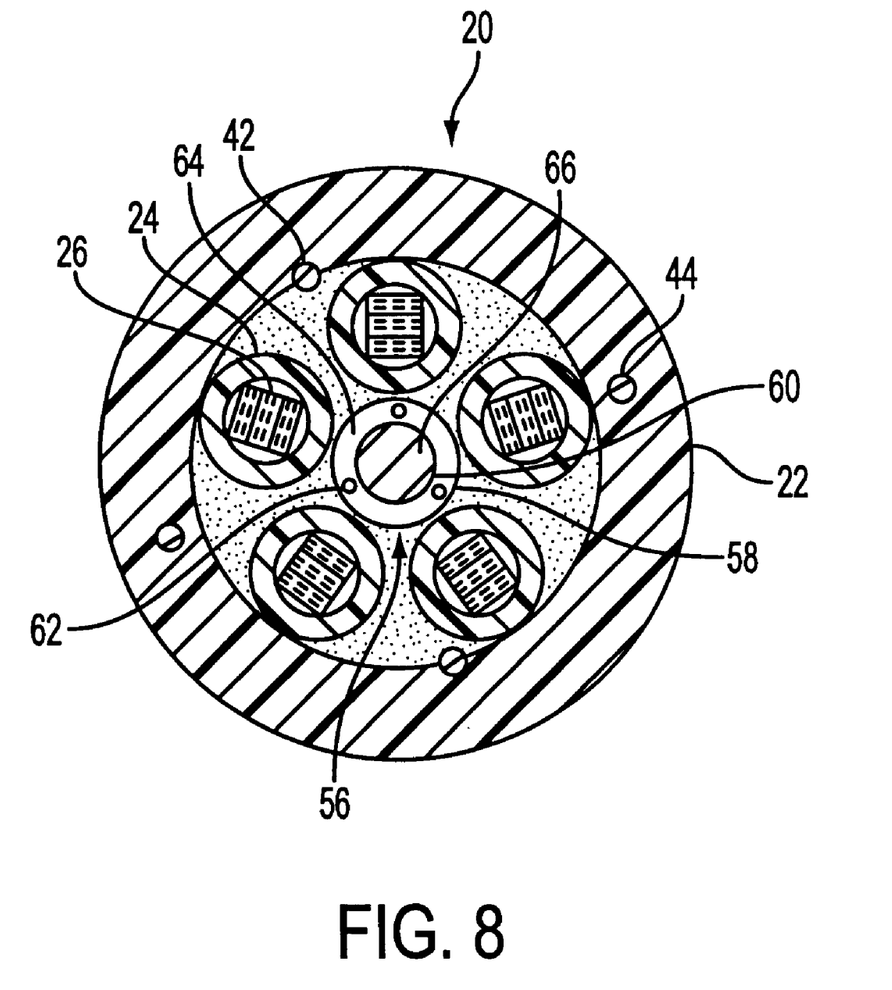
FIG. 8 is sectional view of an additional optical fiber configuration according to the present invention.

A variation of the above-described embodiment is illustrated in FIG. 8, where elements having the same reference numeral as those in FIG. 7 refer to similar elements. Similar to the invention shown in FIG. 7, a CSM 56 is preferably positioned centrally with respect to the outer jacket 22. The CSM 56 also includes a strength tube 58 made of, for example, a plastic, and has a center portion 60. A plurality of inner strength members or strength rods 62 are entirely disposed, in a longitudinal direction, within a wall 64 of the strength tube 58. The strength rods 62 may respectively be made of a material, such as a glass reinforced plastic, as is similarly described above in other embodiments. To avoid migration down the length of the cable, the strength tube 58 may be filled with a gel or water-absorbing powder 66 or any other water barrier material known in the art.

This embodiment differs from that of FIG. 7 in that the strength rods 62 are completely embedded within the wall 64 of the strength tube 58 and do not extend into the center portion 60. As shown in FIG. 8, three strength rods 62 are disposed within the tube wall 64 to provide strength and resistance to thermal contraction. However, as one skilled in the art will appreciate, more or less strength rods 62 may be used depending on the particular application. The coupling of the strength rods 62 with the tube wall 64, according to this embodiment, aids in expanding the range of thermo-mechanical loads that the optical fiber cable may withstand.

Although, the strength rods shown in FIGS. 7 and 8 are represented as having a circular cross section, other shapes are also contemplated, such as square, trapezoidal and triangular.

Similar to the embodiments illustrated in FIGS. 4 and 6, the optical fiber configurations represented in FIGS. 7 and 8 can also advantageously absorb external compression forces, such as that caused by sheave loading. Specifically, the strength tubes 48 and 58 of the respective CSM's, 46 and 56, in addition to the buffer tubes 24, are operative to be deformed when subjected to a force. As a result, the strength tubes 48 and 58 absorb a portion of the force as opposed to transferring substantially all of the force back upon the buffer tubes 24. The strength tubes 48 and 58 are capable of absorbing a portion of the force in part because they are designed to have a stiffness in the radial direction that is below or close to that of the buffer tube 24.

Although the invention is described as using a central strength member, it will be appreciated that other strength members may be used, in addition to the central strength member. For example, as shown in FIGS. 3–8, strength yarn 42 and radial strength members 44 may be positioned in or under the outer jacket in a traditional way. The additional load-carrying strength yarns and radial strength members may be added if there is a need to increase the stiffness of the load-carrying elements.

It is, of course, understood that departures can be made from the preferred embodiments of the invention by those of ordinary skill in the art without departing from the spirit and scope of the invention that is limited only by the following claims.

What is claimed:

1. An optical fiber cable configuration, comprising:
a plurality of buffer tubes respectively housing at least one optical fiber;
a strength tube having a hollow portion, said buffer tubes being positioned radially around said strength tube such that an outer portion of said strength tube makes contact with an outer portion of at least one of said buffer tubes when a load is applied to said optical fiber configuration,
wherein said strength tube has a higher degree of deformation than said buffer tube when said optical fiber cable configuration is subjected to the load.

2. The optical fiber cable configuration of claim 1, wherein said strength tube further comprises at least one strength rod positioned within said hollow portion, wherein an open space is provided between at least a portion of said strength rod and an inner wall of said hollow portion.

3. The optical fiber cable configuration of claim 1, wherein said hollow portion of said tube has an inner wall and at least one strength rod is loosely disposed on said inner wall.

4. The optical fiber cable configuration of claim 1, wherein said tube has a wall portion; and at least one strength rod is positioned within said wall portion.

5. The optical fiber cable configuration of claim 1, wherein said tube has a wall portion; and at least one strength rod is partially embedded in said wall portion.

6. The optical fiber cable configuration of claim 2, wherein said strength rod is movably positioned within said hollow portion.

7. The optical fiber cable configuration of claim 3, wherein said strength rod is movably positioned within said hollow portion.

8. The optical fiber cable configuration of claim 4, wherein said strength rod is completely surrounded by the wall portion in a longitudinal direction.

9. The optical fiber cable configuration of claim 1, further comprising a water barrier material disposed within said hollow portion of said strength tube.

10. The optical fiber cable configuration of claim 1, wherein a plurality of strength rods are provided along said strength tube.

11. The optical fiber cable configuration of claim 1, wherein said strength tube comprises plastic.

12. The optical fiber cable configuration as in claims 2, 3, 4 or 5, wherein said strength rod comprises glass-reinforced plastic.

13. An optical fiber cable configuration comprising:
an outer jacket;
at least one buffer tube disposed within said outer jacket;
at least one optical fiber positioned longitudinally within said buffer tube; and
a strength tube disposed coaxially along a center portion of said outer jacket, said strength tube having a longitudinally extending hollow portion, wherein said buffer tube is positioned outside of said hollow portion.

14. The optical fiber cable configuration of claim 13, further including at least one strength rod positioned along said hollow portion, wherein an open space is provided between at least a portion of said strength rod and an inner wall of said hollow portion.

15. The optical fiber cable configuration of claim 13, further including at least one strength rod loosely disposed on an inner wall of said strength tube.

16. The optical fiber cable configuration of claim 13, wherein said strength tube has a wall portion; and at least one strength rod is positioned within said wall portion.

17. The optical fiber cable configuration of claim 13, wherein said strength tube has a wall portion; and at least one strength rod is partially embedded in said wall portion.

18. The optical fiber cable configuration of claim 14, wherein said strength rod is movably positioned within said hollow portion.

19. The optical fiber cable configuration of claim 15, wherein said strength rod is movably positioned within said hollow portion.

20. The optical fiber cable configuration of claim 16, wherein said strength rod is completely surrounded by said wall portion in a longitudinal direction.

21. The optical fiber cable configuration of claim 13, further comprising a water barrier material disposed within said hollow portion of said strength tube.

22. The optical fiber cable configuration of claim 13, wherein said strength member has a stiffness in a radial direction that is less than a stiffness in a radial direction of said buffer tube.

23. The optical fiber cable configuration of claim 13, wherein a plurality of buffer tubes are positioned radially around said strength member.

24. The optical fiber cable configuration of claim 13, further including at least one strength yarn.

25. The optical fiber cable configuration of claim 13, further including at least one radial strength member in said jacket.

26. The optical fiber cable configuration of claim 13, wherein a plurality of strength rods are provided along said strength tube.

27. The optical fiber cable configuration as in claims 14, 15, 16 or 17, wherein said strength tube comprises plastic.

28. The optical fiber cable configuration of claim 14, wherein said strength rod comprises glass-reinforced plastic.

29. An optical fiber cable configuration comprising:
an outer jacket;
a plurality of buffer tubes disposed within said outer jacket;
at least one optical fiber positioned longitudinally within said buffer tube; and
means for strengthening disposed longitudinally along a center portion of said outer jacket such that said plurality of buffer tubes are positioned outside of said means for strengthening, wherein an outer portion of said means for strengthening makes contact with an outer portion of at least one of said buffer tubes when a load is applied to said optical fiber configuration, and wherein said means for strengthening has a higher degree of deformation than said buffer tube when said optical fiber cable configuration is subjected to the load.

30. The optical fiber cable configuration of claim 29, wherein the means for strengthening further comprises a water barrier material.

31. The optical fiber cable configuration of claim 29, wherein the load is a radial load.

* * * * *